United States Patent
Takei et al.

(10) Patent No.: US 6,336,295 B1
(45) Date of Patent: Jan. 8, 2002

(54) SHARED VEHICLE PORT AND METHOD AND APPARATUS FOR CONTROLLING THE SAME

(75) Inventors: Akihiko Takei; Tooru Saitou, both of Wako; Shinzou Urushidani, Sayama, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/391,595

(22) Filed: Sep. 8, 1999

(30) Foreign Application Priority Data

Sep. 9, 1998 (JP) .......................................... 10-255781
Sep. 9, 1998 (JP) .......................................... 10-255782

(51) Int. Cl.7 ................................................. E04H 6/12
(52) U.S. Cl. ........................................ 52/174; 414/231
(58) Field of Search ............................ 52/174; 414/231, 414/232

(56) References Cited

U.S. PATENT DOCUMENTS

| | | | | |
|---|---|---|---|---|
| 1,394,999 A | * | 10/1921 | McKinstry | ................. 52/174 X |
| 4,952,112 A | * | 8/1990 | Piacenza | .................... 52/174 X |
| 5,469,676 A | * | 11/1995 | Colsman | ...................... 52/174 |
| 5,470,185 A | * | 11/1995 | Tsubota et al. | ........... 52/174 X |

* cited by examiner

Primary Examiner—Peter M. Cuomo
Assistant Examiner—Michael J. Fisher
(74) Attorney, Agent, or Firm—Arent Fox Kintner Plotkin & Kahn, PLLC (57) ABSTRACT

The present invention relates to the shared vehicle port for automatically parking and delivering a shared vehicle used by a plurality of users, comprising: an automatic driving area having a passenger loading area and a passenger unloading area separated from each other and being connected to a vehicle passage via the passenger loading area and the passenger unloading area; and a user waiting area adjacent to the vehicle passage, the passenger loading area, and the passenger unloading area.

6 Claims, 7 Drawing Sheets

SHARED VEHICLE PORT AND METHOD AND APPARATUS FOR CONTROLLING THE SAME

BACKGROUND OF THE INVENTION

1. Field of the Invention

This invention relates to a shared vehicle port and a method and an apparatus for controlling the shared vehicle port in a shared vehicle operating system.

This application is based on Japanese Patent Application Nos. Hei 10-255782 and Hei 10-255781, the contents of which are incorporated herein by reference.

2. Background Art

To alleviate traffic jams and to utilize energy effectively, the present applicant proposes a shared vehicle operating system (in Japanese Patent Applications, First Publication Nos. Hei 8-110997, Hei 8-111908, and Hei 8-147555).

Figure 6:
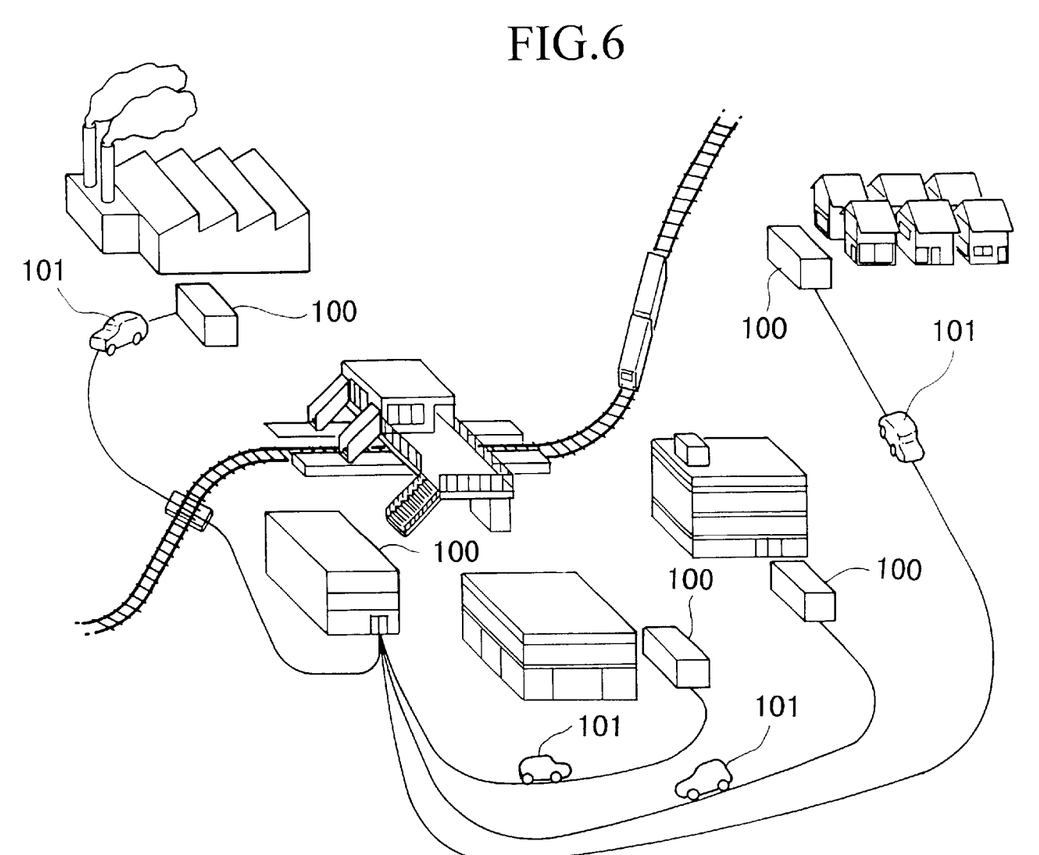
FIG. 6 is a diagram showing an example of the introduction of the shared vehicle operating system.

FIG. 6 is a diagram for explaining the introduction of the shared vehicle operating system.

As shown in this figure, the shared vehicle operating system includes shared vehicle ports 100 distributed over the area. Users can park the shared vehicles 101 in the shared vehicle ports 100.

The user rents the shared vehicle 101 from the nearest shared vehicle port 100, goes to his destination by the shared vehicle 101, and returns the shared vehicle 101 to the shared vehicle port 100 nearest the destination. The returned shared vehicle 101 is parked in the shared vehicle port 100, and will be used by another user who goes to another destination.

This shared vehicle operating system provides shared vehicles 101 to a number of users, thereby eliminating traffic jams and utilizing energy effectively.

Next, the shared vehicle port will be explained below.

Figure 7:
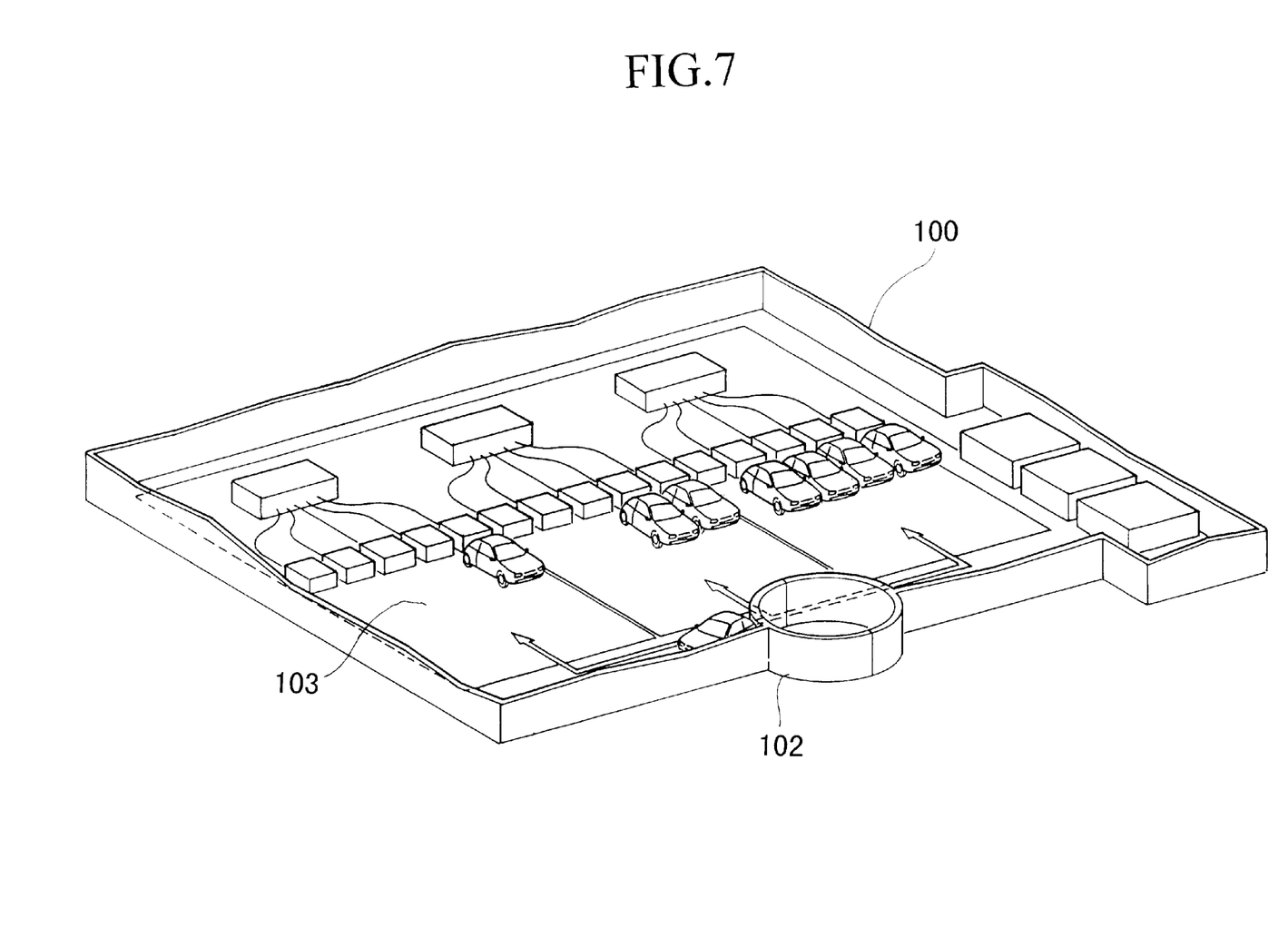
FIG. 7 is a diagram showing an example of the conventional shared vehicle operating system.

FIG. 7 is a diagram for explaining an example of a conventional shared vehicle port.

In this figure, reference numeral 102 denotes a gateway, and reference numeral 103 denotes a parking area for the shared vehicles. The shared vehicles goes in and out of the shared vehicle ports 100 through the gateway 102.

The above shared vehicle port, however, cannot simultaneously allow the entrance and the exit of the shared vehicles to and from the shared vehicle port 100. Therefore, the shared vehicles cannot move in and out smoothly.

SUMMARY OF THE INVENTION

It is therefore an object of the present invention to provide a shared vehicle port and a method for controlling the same, which allow the shared vehicles to move in and out smoothly.

The shared vehicle port of the present invention for automatically parking and delivering a shared vehicle used by a plurality of users, comprises: an automatic driving area having a passenger loading area and a passenger unloading area separated from each other and being connected to a vehicle passage via the passenger loading area and the passenger unloading area; and a user waiting area adjacent to the vehicle passage, the passenger loading area, and the passenger unloading area.

According to the invention, shared vehicles arrive at the passenger unloading area while they separately start from the passenger loading area. Thus, the entrance and exit of the shared vehicles can be accomplished smoothly.

In another aspect of the invention, the user waiting area includes a port terminal for performing operations to rent and return the shared vehicle.

To rent the shared vehicle, the user performs the rental operation to rent the vehicle through the port terminal in the user waiting area adjacent the passenger loading area, and immediately gets into the vehicle in the passenger loading area. To return the shared vehicle, the user exits the vehicle in the passenger unloading area, and immediately performs the returning operation to return the vehicle through the port terminal in the user waiting area. Thus, the rental operation is performed just before the user gets into the vehicle, the returning operation is performed just after the user exits the vehicle. This simplifies the management of the users who rent and return the vehicles.

In another aspect of the invention, an automatic entrance door, which is locked when no shared vehicle is parked in the passenger loading area, is provided between the passenger loading area and the user waiting area, and an automatic exit door, which is locked when no shared vehicle is parked in the passenger unloading area, is provided between the passenger unloading area and the user waiting area.

The automatic entrance door is opened only when a shared vehicle stops in the passenger loading area, while the automatic exit door is opened only when a shared vehicle stops in the passenger unloading area. This invention completely separates the users and the automatically driven shared vehicles.

In another aspect of the invention, the method for controlling a shared vehicle port for automatically parking and delivering a shared vehicle used by a plurality of users, comprises the steps of: performing a rental procedure for renting the shared vehicle according to an operation from a user waiting area adjacent to a vehicle passage, a passenger loading area, and a passenger unloading area; sending an instruction to automatically deliver the shared vehicle after completion of the rental procedure; moving the shared vehicle to the passenger loading area adjacent to the vehicle passage according to the instruction to deliver the shared vehicle; performing a returning procedure for returning the shared vehicle according to an operation from the user waiting area; sending an instruction to automatically park the shared vehicle after the return of said shared vehicle has been completed; and moving the shared vehicle, which is parked in the passenger unloading area adjacent to the vehicle passage, to a shared vehicle parking area.

When the rental procedure is performed, the shared vehicle is moved to the passenger loading area according to the instruction to automatically deliver the vehicle. When the returning procedure is performed, the shared vehicle is moved to the shared car parking area according to the instruction to automatically park the vehicle. These processes are performed separately in the passenger loading area and the passenger unloading area. Therefore, the entrance and exit of the shared vehicles are performed smoothly.

In another aspect of the invention, the method further comprises the steps of: unlocking an automatic entrance door between the passenger loading area and the user waiting area when the shared vehicle stops in the passenger loading area; and unlocking an automatic exit door between the passenger unloading area and the user waiting area when the shared vehicle stops in the passenger unloading area.

The automatic entrance door is opened only when a shared vehicle stops in the passenger loading area, while the automatic exit door is opened only when a shared vehicle stops in the passenger unloading area. This invention completely separates the users and the automatically driven shared vehicles.

In another aspect of the invention, the method further comprises the steps of: opening a passenger loading area gate between the passenger loading area and the vehicle passage when a user gets into the shared vehicle in the passenger loading area; closing the passenger loading area gate when the shared vehicle exits to the vehicle passage; opening a passenger unloading area gate between the passenger unloading area and the vehicle passage when the shared vehicle reaches the shared vehicle port; and closing the passenger unloading area gate when the shared vehicle stops at the passenger unloading area.

The passenger loading area gate is opened only when the shared vehicle goes out, while the passenger unloading area gate is opened only when the shared vehicle goes in. Therefore, a vehicle other than a shared vehicle cannot enter the passenger loading area and the passenger unloading area.

DETAILED DESCRIPTION OF THE PREFERRED EMBODIMENTS

The present invention will be explained with reference to the figures.

Figure 1:
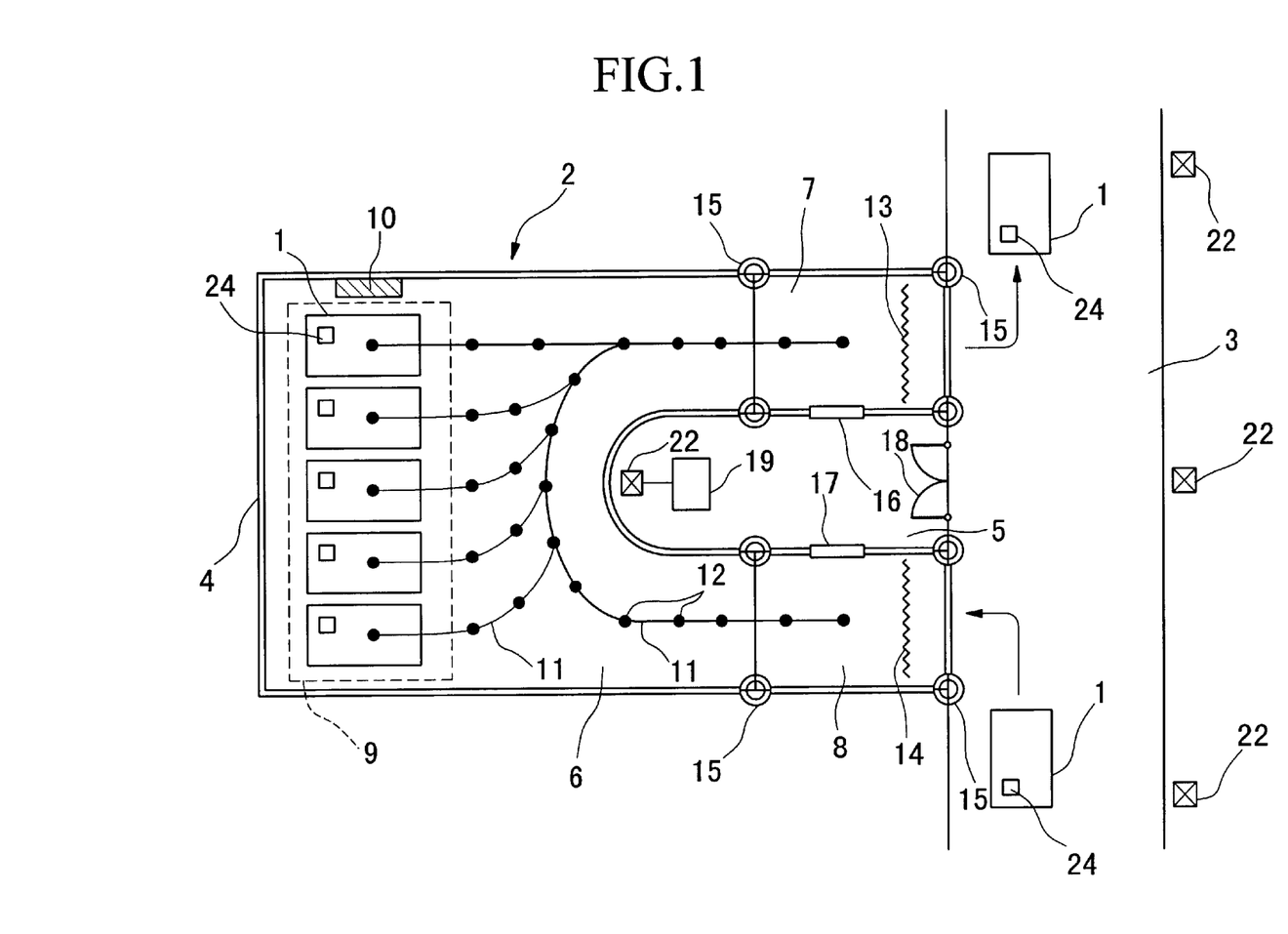
FIG. 1 is a diagram for explaining the structure of the shared vehicle port of the present invention.

FIG. 1 is a diagram for explaining the structure of the shared vehicle port in the embodiment according to the present invention.

The shared vehicles 1 are, for example, electric vehicles. Each shared vehicle 1 has a computer, which includes a CPU (central processing unit) and peripheral devices, a navigation system, and a radio transceiver 24 (which includes an antenna). The shared vehicles are automatically driven according to instructions.

The computer automatically drives the shared vehicle (controls the drive motor, brakes, and steering) along guide lines 11 according to instructions from a port terminal 19, and, when automatic driving is not performed (i.e., when manual driving is performed), also controls the running shared vehicle (controls driving the drive motor, etc.) according to a user operation. The navigation system detects the position of the vehicle, displays a map, and performs route guidance.

The shared vehicle port 2 is adjacent to a vehicle passage 3. The vehicle passage 3 is a road (for example, an ordinary road) through which the vehicles (the shared vehicles or ordinary vehicles) are driven by the users.

The shared vehicle port 2 is comprised by an automatic driving area 4 and a user waiting area 5. In the automatic driving area 4, the shared vehicle 1 is parked and delivered by an automatic operation. In the user waiting area 5, a user performs operations to rent and return the shared vehicle. The user waiting area 5 also serves as a waiting room.

The automatic driving area 4 has a U-shape surrounding the user waiting area 5. At the opening of the U-shape of the automatic driving area 4, the user waiting area 5 is adjacent to the vehicle passage 3.

The automatic driving area 4 is comprised by a fully automatic area 6, a passenger loading area 7, and a passenger unloading area 8. The automatic driving area 4 is connected via the passenger loading area 7 and the passenger unloading area 8 to the vehicle passage 3. The user gets in the shared vehicle 1 in the passenger loading area 7, while the user leaves the shared vehicle 1 in the passenger unloading area 8.

In the fully automatic area 6, a shared vehicle parking area 9 is provided opposite to the vehicle passage 3. In the shared vehicle parking area 9, a number of the shared vehicles 1 (five vehicles in FIG. 1) can be parked. The shared vehicle parking area 9 also serves as a charging port, and an automatic charger 10 is provided therein.

Between the passenger loading area 7 and the passenger unloading area 8, the guide line 11 for guiding the shared vehicle 1 is laid. Between the passenger loading area 7 and the parking spaces in the shared vehicle parking area 9, the guide lines 11 are branched from the main guide line 11 connecting the passenger loading area 7 and passenger unloading area 8.

The guide lines 11 are guide cables embedded in the automatic driving area 4, and generate magnetic signals from an applied alternating current. A magnetic sensor loaded on the shared vehicle 1 detects the alternating current. Based on this detection, it is determined whether the shared vehicle 1 is positioned on the guide lines 11, and the shared vehicle 1 is automatically driven along the guide lines 11. The method for guiding the shared vehicle 1 is not limited to this, and may use an optical sensor for detecting white lines drawn on the ground or other known processes.

Figure 2:
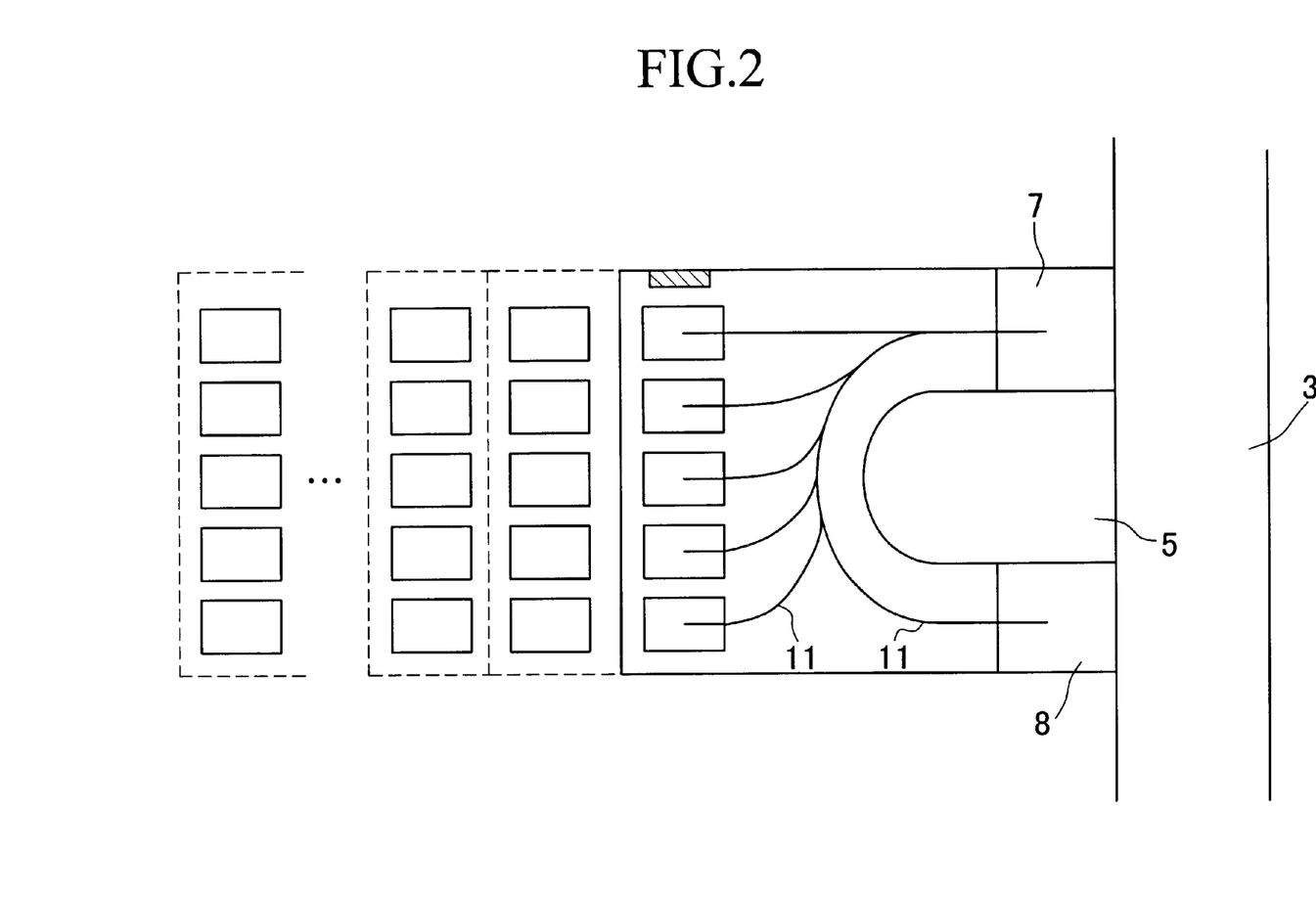
FIG. 2 is a diagram for explaining the modification of the shared vehicle port of the present invention.

According to the layout of the shared vehicle port in the embodiment, to park a large number of cars, parking spaces for the shared vehicles 1 can be added as shown in FIG. 2. Thus, even when a large number of cars are parked, the number of the guide lines 11 can be reduced, and the length of the guide lines 11 remains short. As the number of the parked cars increases, the entire added area can be assigned for the shared vehicle parking area 9, thus effectively utilizing the area.

In FIG. 1, magnetic nails 12 are permanent magnets embedded in the automatic driving area 4 in the shared vehicle port 2. A magnetic nail sensor (not shown) loaded on the shared vehicle 1 detects that the shared vehicle 1 is passing over the magnetic nail 12. The guide lines 11 enable the detection of disalignment of the shared vehicle 1 in the right-left directions, while the magnetic nails 12 enable the detection of disalignment of the shared vehicle 1 in the front-rear direction. The magnetic nails 12 are embedded at the stop points (in the passenger loading area 7 and the passenger unloading area 8) to confirm the arrival of the shared vehicle 1 at the stop point, and on the curves and at the junctions of the guide lines 11 to detect these curves and junctions. In addition to these points, the magnetic nails 12 may be embedded on the guide lines 11 at intervals of, for example, 30 cm.

In the passenger loading area 7 near the vehicle passage 3, a passenger loading area chain (gate) 13 is provided. Also, in the passenger unloading area 8 near the vehicle passage 3, a passenger unloading area chain (gate) 14 is provided. The passenger loading area chain 13 and the passenger unloading area chain 14 can be moved vertically to forbid or permit the shared vehicle 1 to pass between the vehicle passage 3 and the automatic driving area 4.

At four corners of the passenger loading area 7 and at four corners of the passenger unloading area 8, phototubes 15 are provided to detect objects (such as people, obstacles, shared vehicles, or ordinary cars).

In the user waiting area 5, an auto matic entrance door 16, an automatic exit door 17, and a manual door 18 are provided. Through the automatic entrance door 16, the user exits from the user waiting area 5 and gets into the shared vehicle 1 stopped in the passenger loading area 7. Through the automatic exit door 17, the user exits the shared vehicle 1 stopped in the passenger unloading area 8 and enters the user waiting area 5. The manual door 18 allows the user to go in and out of the user waiting area 5 from and to the outside area (the vehicle passage 3).

The user waiting area 5 includes a port terminal 19 for performing the operations to rent and return the shared vehicle 1. The port terminal 19 is a computer which includes a CPU and peripheral devices, and has a read/write unit 20 (hereinafter referred to as "RWU", see FIG. 3) and a communication interface (I/F) 21 (see FIG. 3).

Figure 3:
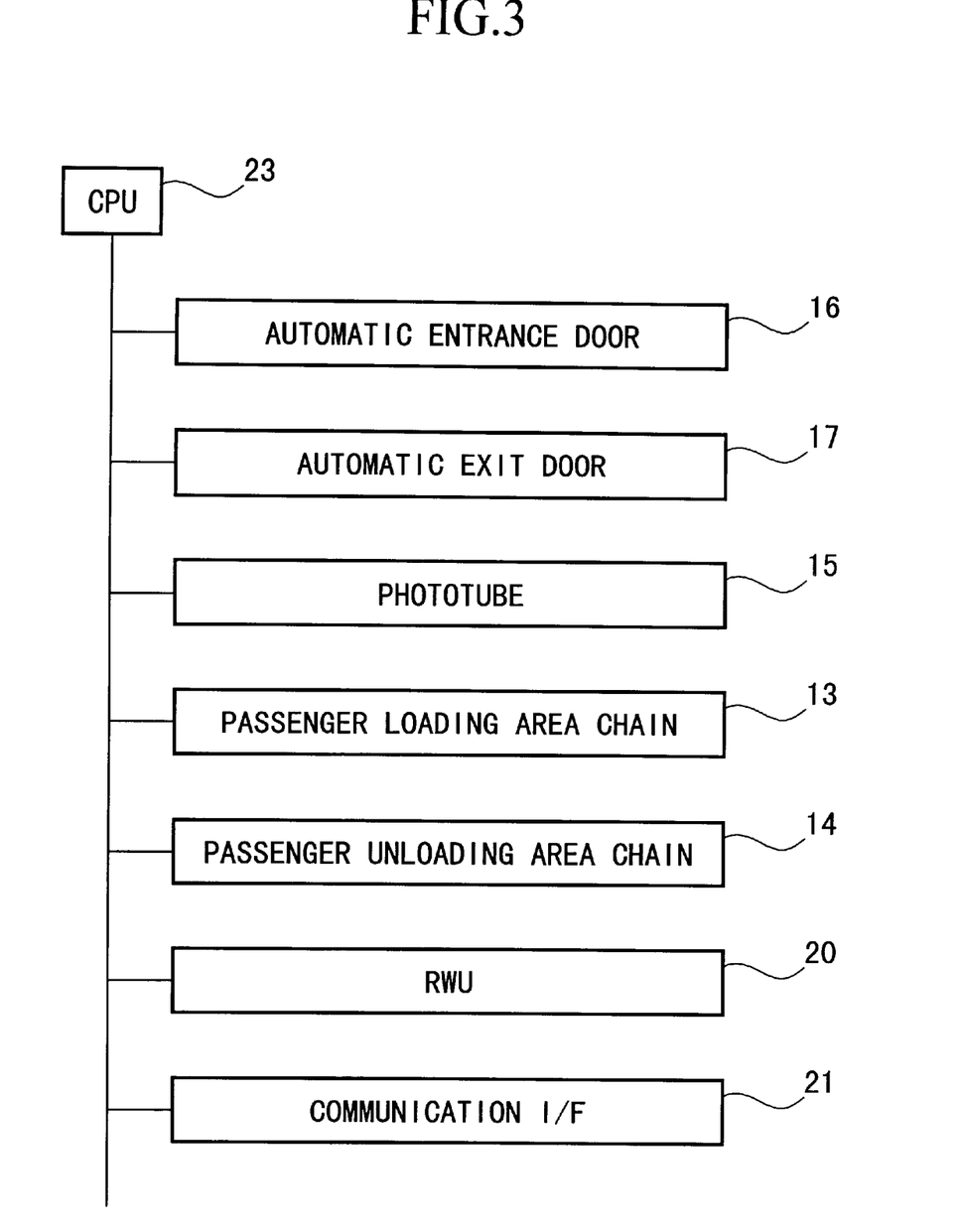
FIG. 3 is a block diagram showing the electrical connections between the parts of the shared vehicle port of the present invention.

The RWU 20 writes and reads data to and from an IC card for administration of the user. In this embodiment, the user has only to hold the IC card over the RWU 20, which then performs the read/write operation to and from the IC card.

The communication I/F 21 is connected to, for example, a cable communication network (such as the Ethernet). The cable communication network is connected to radio communication antennas 22. The radio communication antennas 22 are positioned along the vehicle passage 3 at predetermined intervals (for example, at intervals of 100 meters). The radio communication antennas 22 are provided also in the user waiting area 5. The port terminal 19 sends and receives signals to and from the shared vehicles 1 via the communication I/F 21, the radio communication antennas 22, and the cable communication network.

FIG. 3 is a block diagram showing an example of the electrical connections between the parts in FIG. 1.

In FIG. 3, the same reference numbers are employed to designate like parts in FIG. 1 and a detailed description is omitted.

A CPU 23 is included in the port terminal 19, and controls the parts of the shared vehicle port 2 according to a flow chart described later.

The CPU 23 can lock the automatic entrance door 16 and the automatic exit door 17. When the doors are locked, the user cannot open the automatic entrance door 16 and the automatic exit door 17.

Further, the CPU 23 controls the vertical movement of the passenger loading are a chain 13 and the passenger unloading area chain 14.

Furthermore, the CPU 23 monitors the passenger loading area 7 and the passenger unloading area 8 through the phototubes 15. When an object other than the shared vehicle 1 (for example, people, obstacles, or an ordinary car) is found, the process for automatically parking and delivering the shared vehicle 1 in the automatic driving area 4 is stopped.

The process to allow the user to get into the shared vehicle using the above described structure will be explained.

Figure 4:
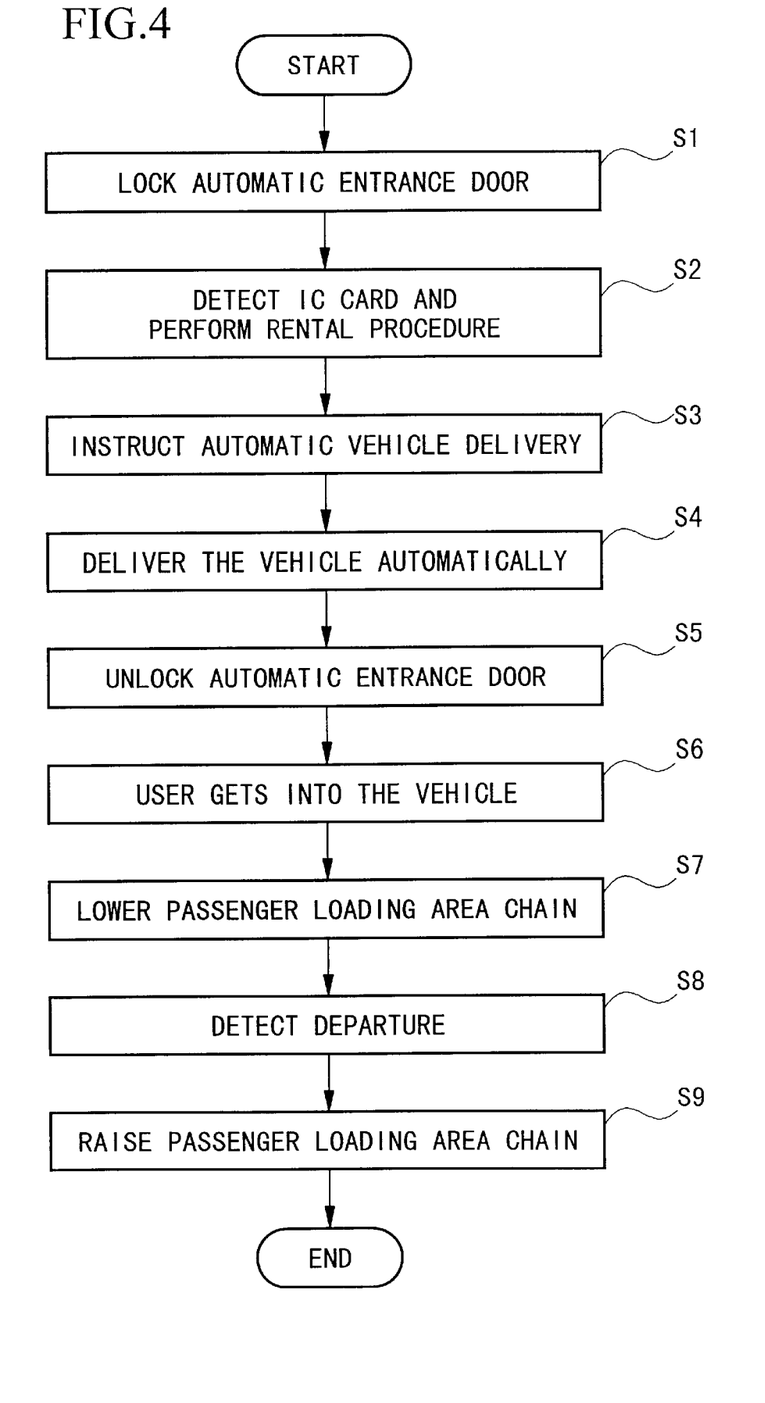
FIG. 4 is a flow chart showing the process to allow a user to get into the vehicle in the shared vehicle port of the present invention.

FIG. 4 is a flow chart showing an example of the process to allow the user to get into the shared vehicle in the shared vehicle port.

The CPU 23 in the port terminal 19 locks the automatic entrance door 16 (step SI).

When the user holds the IC card over the RWU 20 of the port terminal 19, the CPU 23 in the port terminal 19 detects the IC card in step S2. On detecting the IC card, the CPU 23 in the port terminal 19 performs a rental procedure for renting the shared vehicle 1. For example, verification of the ID number of the IC card, selection of the available shared vehicle 1 (based on battery check or the like), etc., are performed.

When the rental procedure is completed, the CPU 23 in the port terminal 19 instructs the delivery of the shared vehicle 1 using the radio communication in step S3.

On receiving the instruction, the CPU of one of the shared vehicles 1 parked in the shared vehicle parking area 9 sets a shift lever to a drive range to start the shared vehicle 1 in step S4. The CPU of the shared vehicle 1 drives the shared vehicle 1 along the guide line 11 to the passenger loading area 7, and stops the shared vehicle 1 when detecting the magnetic nail 12 in the passenger loading area 7. Then, the CPU of the shared vehicle 1 sets the shift lever to a parking range, and transmits a signal indicating the stopping of the shared vehicle 1 using the radio communication.

On receiving the stopping signal of the shared vehicle, the CPU 23 in the port terminal 19 unlocks the automatic entrance door 16 in step S5.

When the user approaches the shared vehicle 1 through the automatic entrance door 16 and holds the IC over the door of the shared vehicle 1, the CPU of the shared vehicle 1 opens the door of the shared vehicle 1 in step S6. When the user gets into the shared vehicle 1 and inserts the IC card into a driver's panel, the CPU of the shared vehicle 1 transmits the completion of getting into the car.

On receiving the completion of getting on the car, the CPU 23 in the port terminal lowers (opens) the passenger loading area chain 13 in step S7. Then, the user drives the shared vehicle 1 to exit to the vehicle passage 3.

When the shared vehicle 1 goes out to the vehicle passage 3, the CPU 23 in the port terminal 19 detects the exit of the shared vehicle 1 by the phototubes 15 in step S8.

When the exit of the shared vehicle 1 is detected, the CPU 23 in the port terminal 19 raises (closes) the passenger loading area chain 13 in step S9.

Thus, the process to allow the user to get into the car in the shared vehicle port is completed.

The process to allow the user to exit the shared vehicle in the shared vehicle port will be explained.

Figure 5:
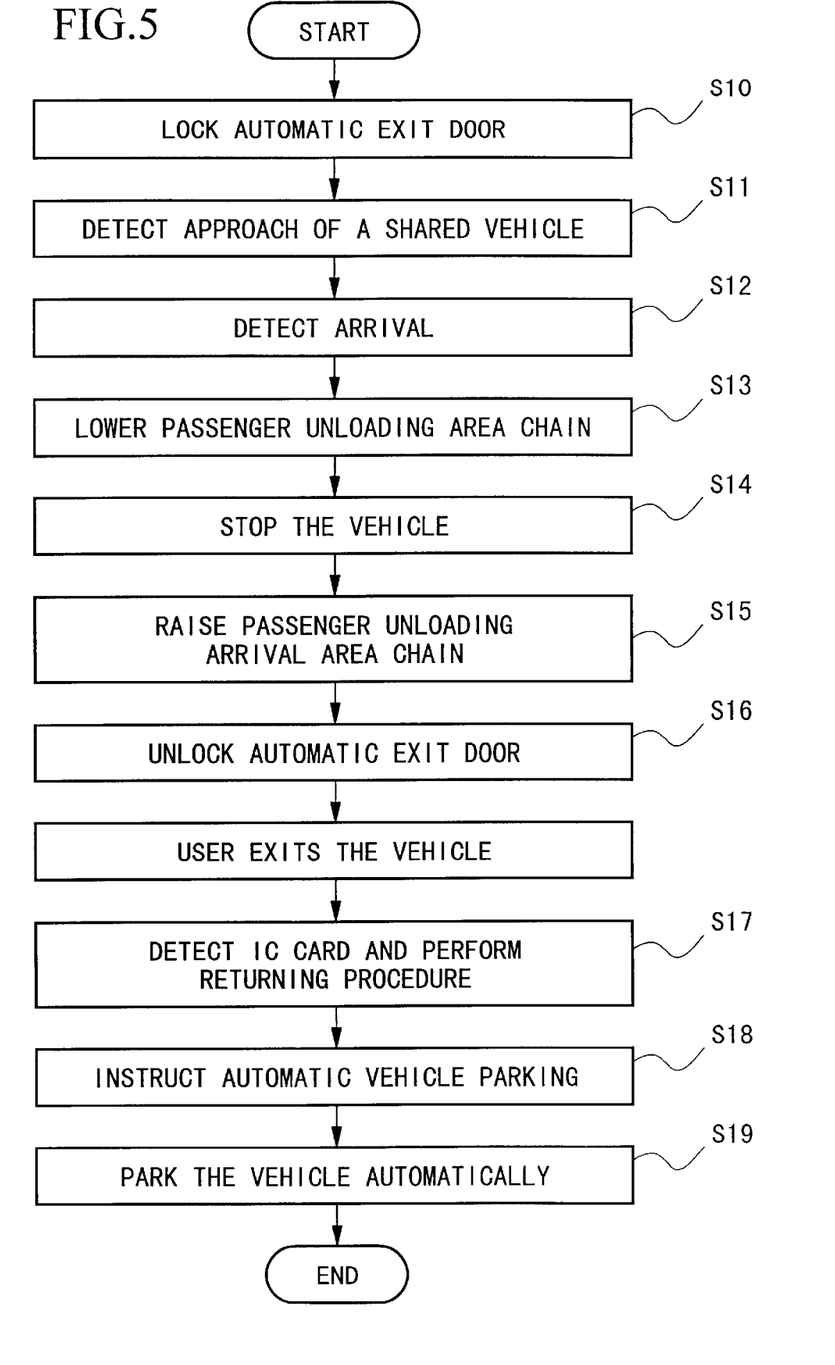
FIG. 5 is a flow chart showing the process to allow a user to exit the vehicle in the shared vehicle port of the present invention.

FIG. 5 is a flow chart showing one example of the process to allow the user to exit the car in the shared vehicle port.

The CPU 23 in the port terminal 19 normally locks the automatic exit door 17 (step S10).

In step S11, the CPU of the shared vehicle 1 transmits its car position as detected by the navigation system by the radio transceiver 24. The transmitted car position is received by the radio communication antenna 22, and sent via the communication I/F 21 to the CPU 23 in the port terminal 19. The CPU 23 in the port terminal 19 compares a predetermined position in the shared vehicle port 2 with the received position of the shared vehicle 1, and then determines whether the shared vehicle 1 has reached the position.

In another example, because the communication range between the radio communication antenna 22 and the radio transceiver 24 (on the shared vehicle 1) is comparatively short, the arrival of the shared vehicle 1 may be determined by detecting that the shared vehicle 1 enters the communication range around the radio communication antenna near the port terminal 19.

When the shared vehicle 1 reaches the connection point between the vehicle passage 3 and the passenger unloading area 8, the CPU 23 in the port terminal 19 detects the arrival of the shared vehicle 1 by the phototubes 15 in step S12.

When the arrival of the shared vehicle 1 is detected, the CPU 23 in the port terminal 19 lowers (opens) the passenger unloading area chain 14 in step S13. Then, the user drives the shared vehicle 1 into the passenger unloading area 8.

When the shared vehicle 1 enters and stops in the passenger unloading area 8, the CPU of the shared vehicle 1 transmits a signal indicating the stopping of the shared vehicle 1 using the radio communication in step S14. Then, the CPU of the shared vehicle 1 plays the necessary messages such as "Do not leave things behind" from speakers of the navigation system.

On receiving the signal indicating the stopping of the shared vehicle 1, the CPU 23 in the port terminal raises the passenger unloading area chain 14 in step S15.

Further, on receiving the stopping of the shared vehicle 1, the CPU 23 in the port terminal 19 unlocks the automatic exit door 17 in step S16.

The user in the shared vehicle 1 sets the shift lever to the parking range, pulls out the IC card from the driver's panel, exits the shared vehicle 1, and closes the door of the shared vehicle 1. Then, the user enters the user waiting area 5 through the automatic exit door 17, and holds the IC card over the RWU 20 of the port terminal 19.

When the user holds the IC card over the RWU 20 of the port terminal, the CPU 23 of the port terminal 19 detects the IC card in step S17. When the IC card is detected, the CPU 23 of the port terminal 19 performs a returning procedure for returning the shared vehicle 1. In this returning procedure, verification of the ID number of the IC card, calculation of the charge by time (for use of the shared vehicle 1), etc., are performed.

When the returning procedure is completed, the CPU 23 in the port terminal 19 instructs the automatic parking of the shared vehicle 1 by the radio communication in step S18.

On receiving the instruction, the CPU of the shared vehicle 1 stopped in the passenger unloading area 8 sets the shift lever to the drive range, and starts the shared vehicle 1 in step S19. The CPU of the shared vehicle 1 drives the shared vehicle 1 along the guide lines 11 to the shared vehicle parking area 9, and stops the shared vehicle 1 when detecting the magnetic nail 12 in the shared vehicle parking area 9. Then, the CPU of the shared vehicle 1 sets the shift lever to the parking range.

When the amount of electric energy stored in the battery is not enough, the CPU of the shared vehicle 1 moves the shared vehicle 1 to the charging port (which is at the end of the shared vehicle parking area 9).

Thus, the process to allow the user to exit the shared vehicle 1 is completed.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A shared vehicle system for automatically parking and delivering a shared vehicle used by a plurality of users, comprising:

an automatic driving area having a passenger loading area and a passenger unloading area separated from each other and being connected to a vehicle passage via said passenger loading area and said passenger unloading area; and a user waiting area adjacent to said vehicle passage, said passenger loading area, and said passenger unloading area, wherein said vehicle passage has a guiding device that guides the shared vehicle to be automatically moved from the passenger unloading area to parking spaces and automatically moved from said parking spaces to the passenger loading area.

2. A shared vehicle system according to claim 1, wherein said user waiting area includes a port terminal for performing operations to rent and return said shared vehicle.

3. A shared vehicle system according to any one of claims 1 and 2, wherein an automatic entrance door, which is locked when no shared vehicle is parked in said passenger loading area, is provided between said passenger loading area and said user waiting area, and an automatic exit door, which is locked when no shared vehicle is parked in said passenger unloading area, is provided between said passenger unloading area and said user waiting area.

4. A shared vehicle system for automatically parking and delivering a shared vehicle according to claim 1, wherein said automatic driving area has a U-shape surrounding said user waiting area.

5. A shared vehicle system for automatically parking and delivering a shared vehicle used by a plurality of users, comprising:

an automatic driving area having a passenger loading area and a passenger unloading area separated from each other and being connected to a vehicle passage via said passenger loading area and said passenger unloading area; and a user waiting area adjacent to said vehicle passage, said passenger loading area, and said passenger unloading area, wherein said vehicle passage has a guiding device that guides the shared vehicle to be automatically moved from the passenger unloading area to parking spaces and automatically moved from said parking spaces to the passenger loading area; and wherein said shared vehicle has a sensor to detect signals from said guiding device to facilitate the automatic parking and delivering of the shared vehicle.

6. A shared vehicle system for automatically parking and delivering a shared vehicle according to claim 5, wherein said guiding device generates magnetic signals and said senor detects said magnetic signals.

* * * * *